Aug. 8, 1933.  K. T. ROMIE  1,921,003
CONCRETE BLOCK MOLDING MACHINE
Filed Feb. 20, 1928  5 Sheets-Sheet 1

KARL T. ROMIE  INVENTOR
BY
ATTORNEY

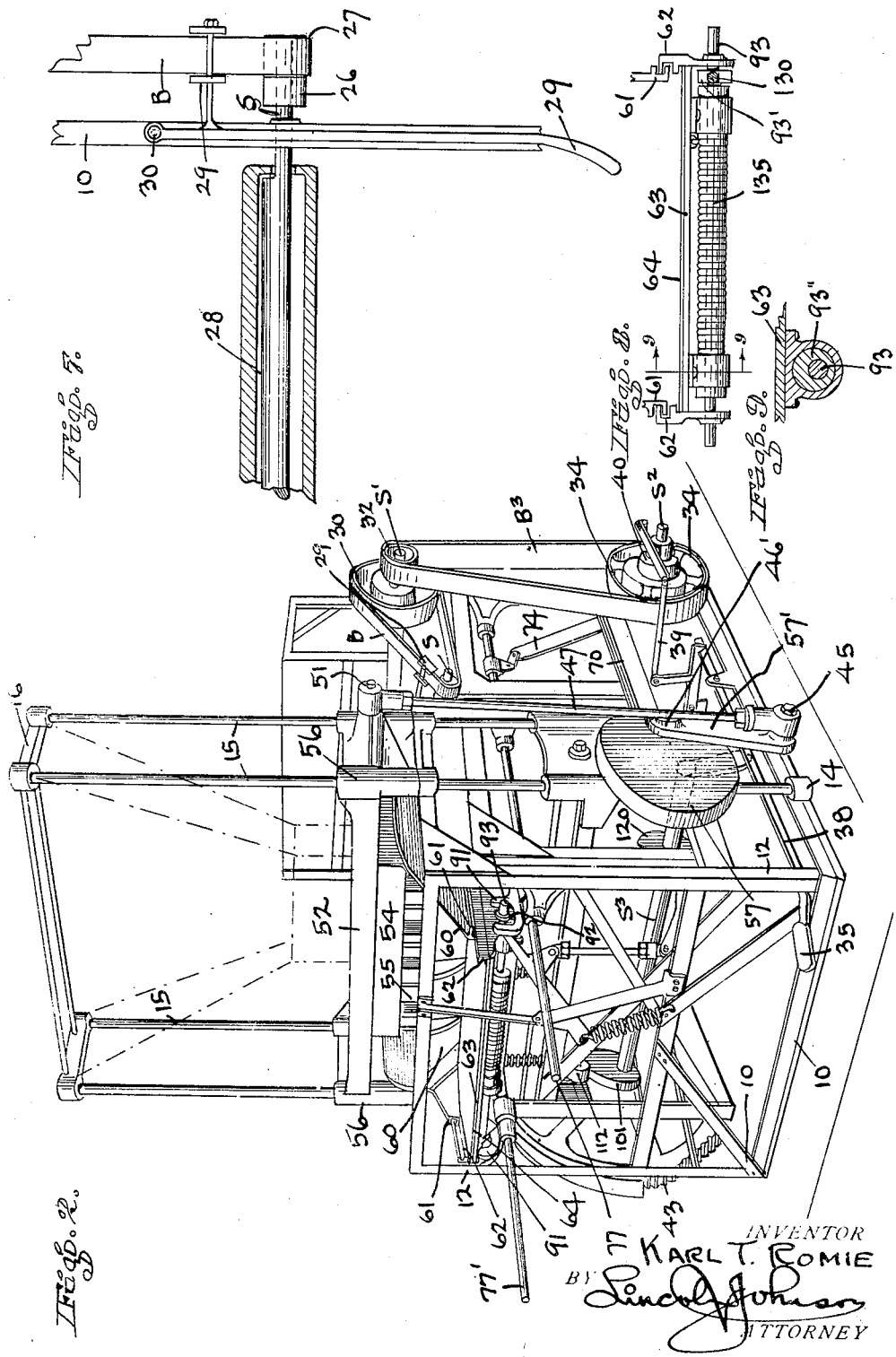

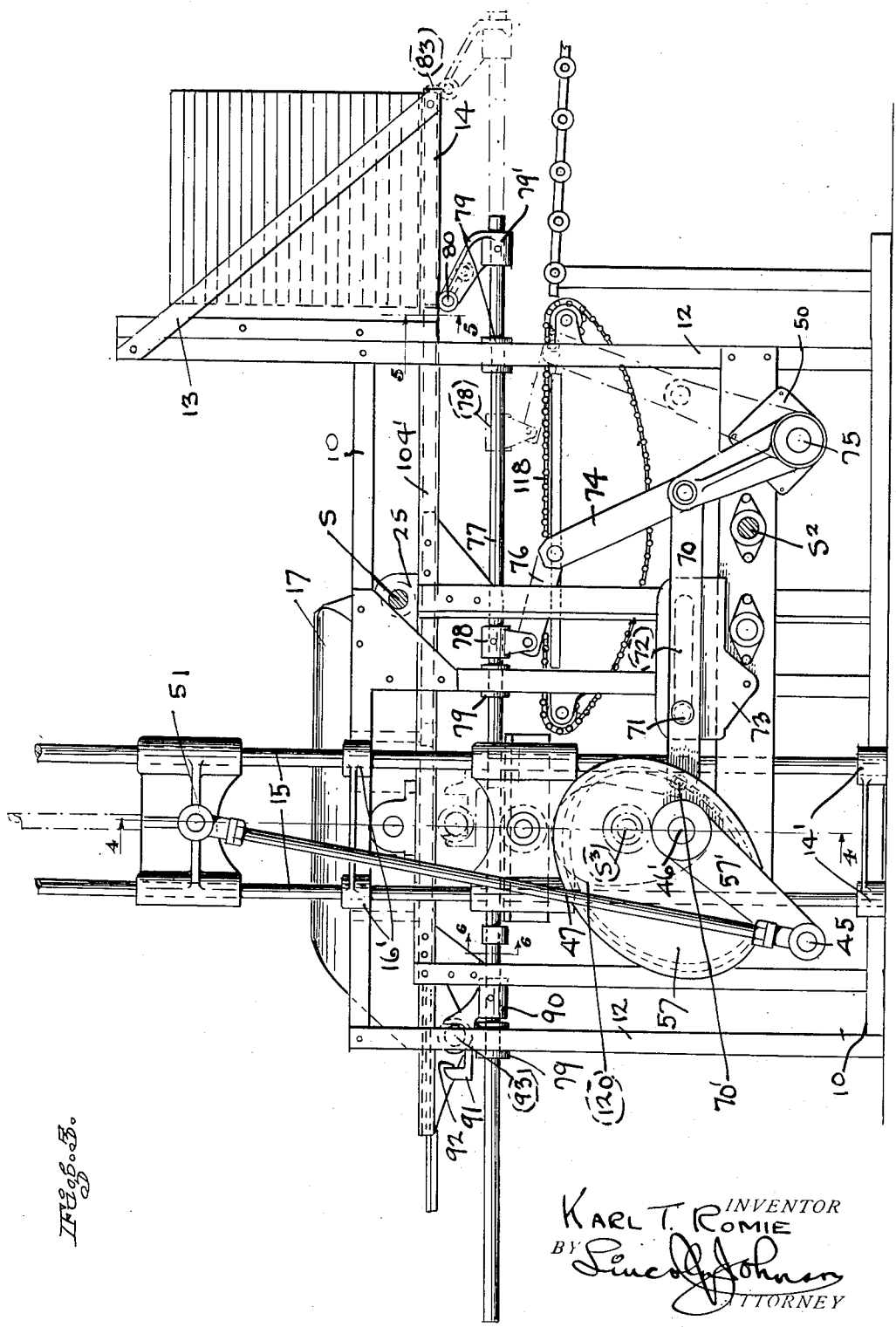

Aug. 8, 1933.  K. T. ROMIE  1,921,003
CONCRETE BLOCK MOLDING MACHINE
Filed Feb. 20, 1928  5 Sheets-Sheet 4
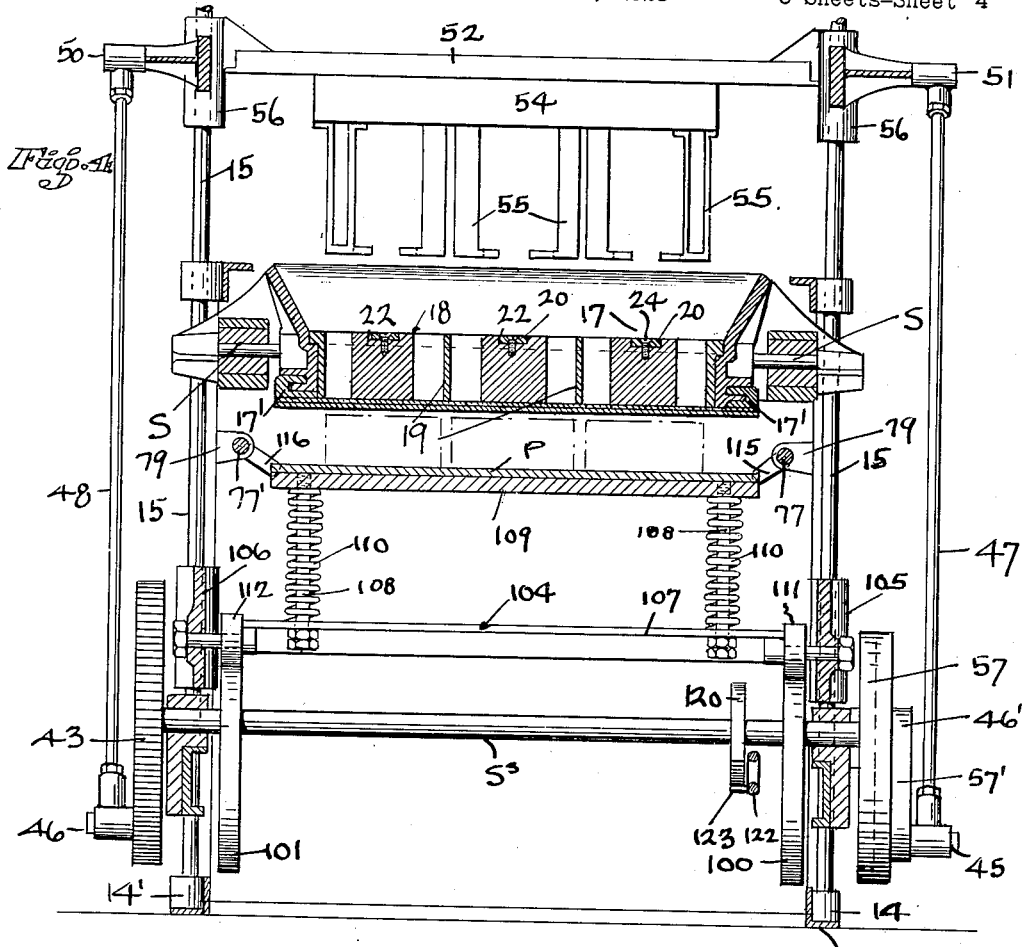
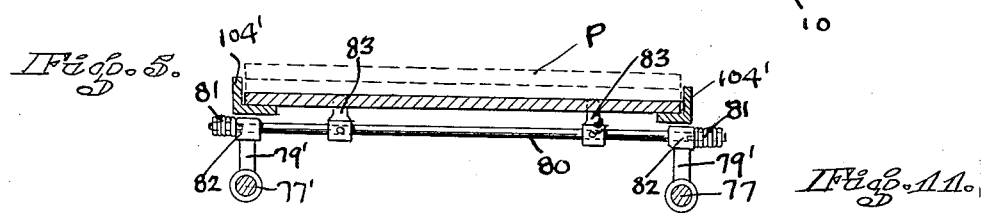
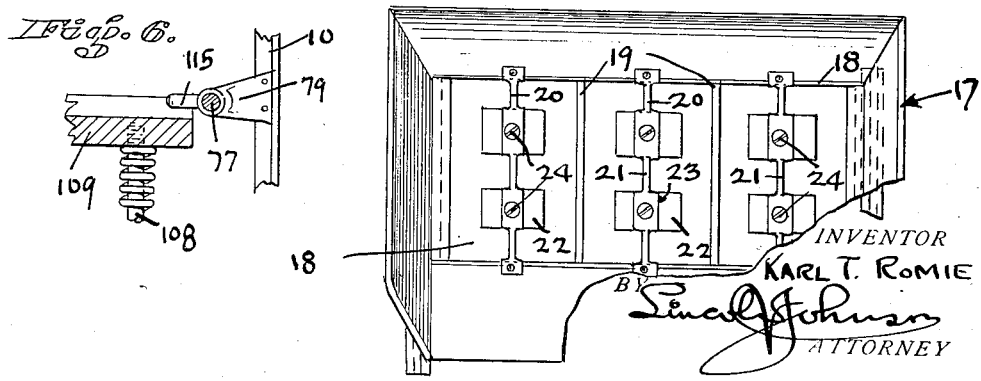
INVENTOR
KARL T. ROMIE
BY
ATTORNEY

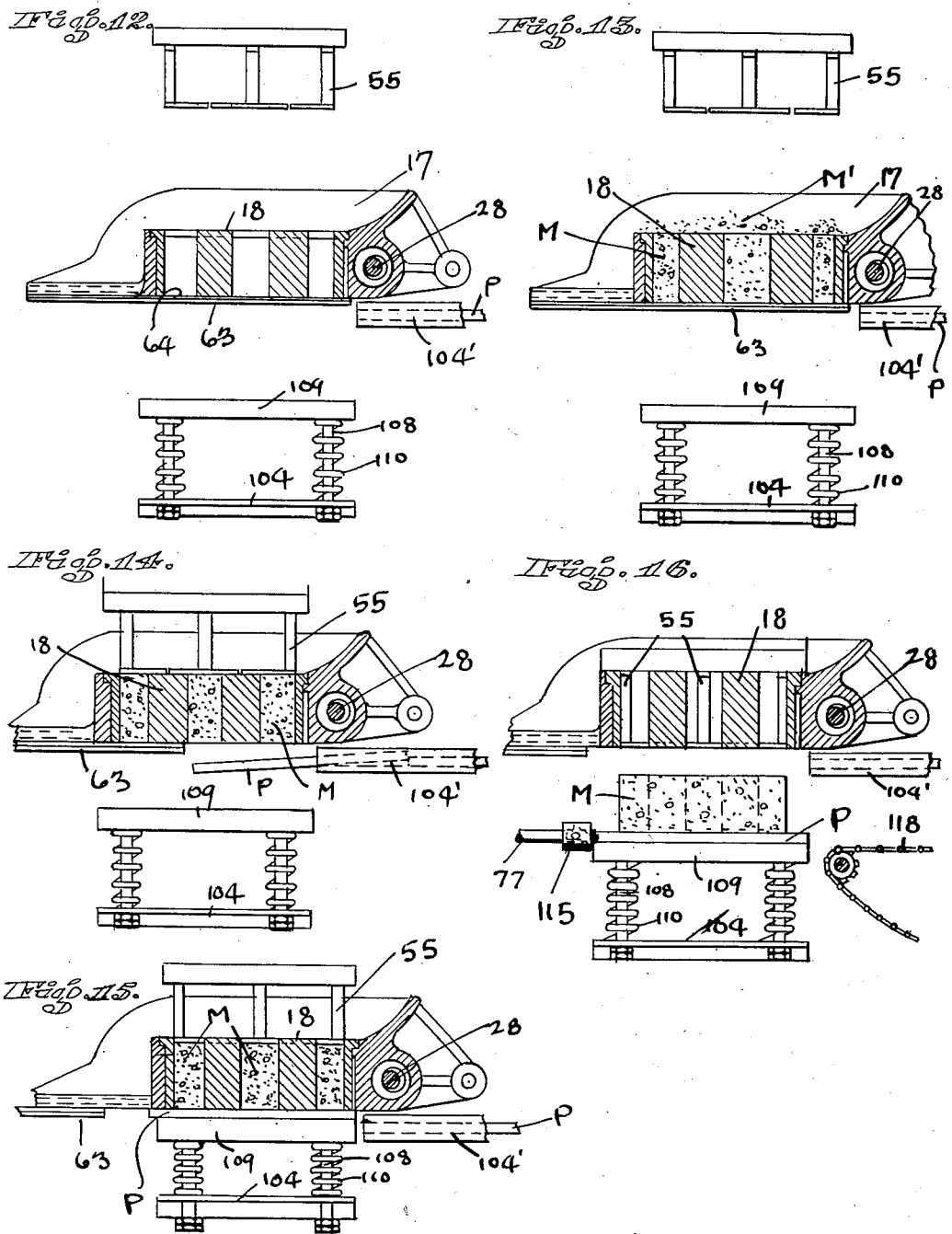

Patented Aug. 8, 1933

1,921,003

UNITED STATES PATENT OFFICE 1,921,003

CONCRETE BLOCK MOLDING MACHINE

Karl T. Romie, Los Angeles, Calif.

Application February 20, 1928. Serial No. 255,509

12 Claims. (Cl. 25—41)

This invention relates to the art of manufacturing concrete building blocks and more particularly to a machine and method for forming the same.

An object of this invention is to provide a machine and method that will, with a maximum saving of time and labor, manufacture concrete blocks in an efficient manner without jeopardizing the compactness, durability, lightness, strength, resistance to the elements, or other inherent qualities of high grade building blocks.

A further object of the invention contemplates a molding machine having a stationary mold with a removable bottom; an agitating means is provided and a plurality of stacked pallets are caused to travel in procession along a track, each pallet relieving the removable bottom from the mold temporarily to receive blocks from the mold and conduct them to an endless carrier. A further feature of the invention is the provision of an ejector for removing the blocks from the mold and depositing them on a pallet. Convenience of arrangement of parts and subsequent compactness are further desiderata that have been borne in mind and the various elements enable each department of the invention to perfrom its respective function at the proper time and cooperate in the production of high grade construction blocks.

Other objects of the invention are to provide a concrete block molding apparatus consisting of a mold closed on the bottom by a resilient plate to which the molding material will not adhere during the molding operation so arranged that said plate may be removed at the completion of the molding operation and a pallet placed beneath the mold to receive the molded product.

In the specification and the annexed drawings, the invention is illustrated in the form considered to be the best, but it is to be understood that the invention is not limited to such form, because it may be embodied in other forms, and it is also to be understood that in and by the claims following the description it is desired to cover the invention in whatsoever form it may be embodied.

In the accompanying five sheets of drawings:

Fig. 2 is a front perspective view of the device similar to Fig. 1, taken at a different angle so as to reveal other operative elements of the device.

Fig. 3 is a side view of the device showing clearly the pallets in stacked relationship and the means for causing these pallets to form a procession from the stack to the mold, where they are loaded and passed to the carrier.

Fig. 4 is a sectional view taken vertically through the assembled machine substantially along the lines 4—4 of Fig. 3.

Fig. 5 is a sectional view taken substantially along the lines 5—5 of Fig. 3 and taken in the direction of the arrows; this view has the substantial effect of being a front view of the stacked pallets and pallet ejector.

Fig. 6 is a sectional view taken along the lines 6—6 of Fig. 3 in the direction of the arrows.

Fig. 7 is a sectional view taken through the agitating means and showing the manner in which the same is operated.

Fig. 8 is a fragmentary view of the removable mold bottom, reference being had to Fig. 2.

Fig. 9 is a sectional view taken substantially along the lines 9—9 of Fig. 8 in the direction of the arrows.

Fig. 11 is a fragmentary top plan view of the open mold proper.

Fig. 12 is an illustrative sectional view taken through the mold showing the respective positions of the pallet receiving member and ejector in the first step of manufacture when the mold is empty.

Fig. 13 is an illustrative view similar to Fig. 12 when the mold is filled.

Fig. 14 is an illustrative view similar to Fig. 12 as the mold bottom is being removed in favor of one of the pallets which is superseding the same.

Fig. 15 is an illustrative view similar to Fig. 12 showing the manner in which the pallet is resiliently supported on the bottom of the mold.

Fig. 16 is an illustrative view similar to Fig. 12 when the completed blocks have been ejected and rest on one of the pallets to be conveyed to the endless carrier.

Figure 1:
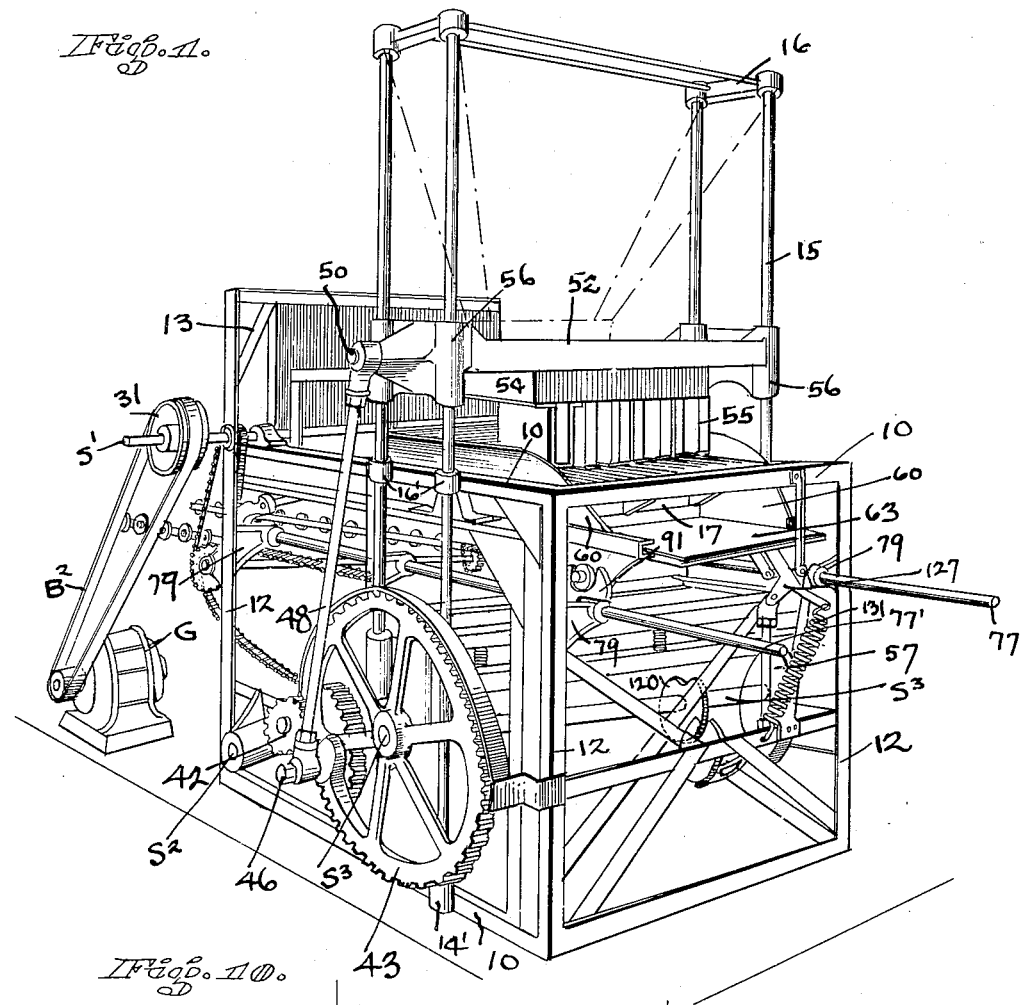
Fig. 1 is a perspective view of the device showing the same in assembled relation, this view being taken at a slight angle from the front of the machine to clearly illustrate the ejecting device and other operative elements of the same.

The above mentioned drawings, wherein similar characters of reference designate similar parts throughout the various figures described, adequately illustrate my invention and the following detailed description is commensurate with the above mentioned drawings in enabling an artisan to construct and assemble the constituent parts of the same.

The device, in its general organization, involves a framework having top and bottom side pieces 10, cross pieces 11, and vertical corner pieces 12. The rear corner pieces extend upwardly beyond the top of the framework and a pair of tension stays 13 extend from the top of the extended corner pieces downwardly at an incline to support the outer end of a pallet table 14. This table, together with the corner pieces and stays, form a pallet rack.

Suitable sockets are provided at 14' on the pieces 10, and in these sockets are mounted vertical guide rods 15 connected together at their upper ends by a frame 16 and braced as at 16'. Various braces, stays, cross bars and other conventional equipment form a part of the stationary structure of my machine. These will only be referred to when their particular function is desired to be emphasized, and I will now proceed to describe the active movable parts of the device.

Referring more particularly to Figs. 1, 3, 4 and 7, the actual mold is designated at 17. This mold is fixedly supported at 17' on channels which are mounted in any suitable manner on the stationary framework of the machine. The mold is a rectangular structure 18 (Fig. 11) having partitions 19, thereacross. Extending transversely across the mold are a plurality of core suspension elements 20 having restricted portions 21. The cores are shown at 22 and may or may not have the unrestricted portions of the core suspension elements countersunk as at 23, therein. The cores are held in place on the suspension elements by suitable screws 24, or the like.

A shaft S extends transversely across the rear of the mold, and is mounted in any suitable manner thereon, as in bearings 25. Referring to Fig. 7, the shaft S has a pulley 26 and an idler wheel 27 on one end thereof and an eccentric portion 28 extending through the shaft housing on the rear of the mold 17. A shifting mechanism 29 is pivoted as at 30 to the bar 10 and enables the drive belt B to be shifted from a neutral position on the idler wheel 27 to an operative position on the wheel 26. It will be readily apparent that rapid rotation of the shaft S will cause agitation or vibration of the mold to settle and compact the molding material within the mold.

The belt B passes around a drive wheel 30' mounted on a shaft S', (Fig. 2) which shaft has a pulley 31 (Fig. 1) mounted on its opposite end connected by a belt $B^2$ to a suitable source of power G. A band wheel 32 on the shaft S' has a belt $B^3$ thereon operatively connecting the wheel 32 to a larger pulley 34 on a shaft $S^2$ by the clutch 40, or to idle at will, by actuating a foot pedal 35 through lever 38 and a train of elements 39 to engage the clutch 40 with the shaft $S^2$.

A counterbalance disk 57 is secured to the end of the shaft $S^3$, opposite the gear 43 and said disk 57 has a crank arm 57' pivoted thereto at 46' adjacent its periphery. A pin 45 is secured in the opposite end of the arm 57' and a connecting rod 47 is pivotally connected to the arm 57', by means of the pin 45. A gear 43 has a pivot pin 46 mounted adjacent its periphery and a connecting rod 48 is pivotally attached thereto. These connecting rods 47 and 48 extend upwardly and are suitably connected by the pins 50 and 51 respectively to an ejector assembly 52.

The shaft $S^2$ extends across the framework, as may be clearly seen in Fig. 1. A train of gears 42 lead to an operative connection with a gear 43 mounted on a shaft $S^3$ which is journaled across the frame.

This ejector comprises a member 52 (Fig. 2) having a depending block 54 to the underside of which are attached a plurality of ejecting elements 55 shaped so as to pass into the openings through the mold to engage the material in the mold. The ejector has slides 56 slidably mounted on the guides 15 and is capable of being lowered to a position where the elements 55 enter the mold. The eccentric disk 57 above referred to counterbalances the reciprocating movement of the ejector.

In Fig. 2, a pair of inclined members 60 are shown at opposite ends of the mold having channels 61 along their lower edges. These channels are disposed outwardly in opposite directions and are adapted to receive slidably and inwardly disposed channels 62 mounted on a movable plate or bottom 63. This movable bottom has a rubber facing 64 thereon, to form a closure or bottom for the mold. The rubber facing is non-adherent to the monolithic mass to be molded in the mold, whereas the metallic material forming the mold will adhere to the monolithic mass. This bottom and facing, as will appear as the description proceeds, is adapted to be alternately disposed beneath the mold and removed therefrom, by purely mechanical means. The ensuing paragraph, when taken in connection with Fig. 3, will serve to illustrate this mentioned mechanical means, The counterbalance 57 (Fig. 3) has a cam slot formed on its inner face within which a pin 70' secured to the link 70 is confined. The link 70 has a pin 71 thereon, that moves in a guide slot 72 in a plate 73. One end of the link 70 is pivoted to the central portion of the lever-link 74. This lever-link 74 is pivoted to the frame 50 at 75. A link 76 is attached pivotally to a collar 78 on the rod 77, and to an end of the lever-link 74. A duplication of elements 75, 76 and 78 on the other side of the machine serves to drive or reciprocate a rod 77' similar to the rod 77. However, I contemplate eliminating these parts if desired, by merely placing one or more cross beams between the two rods. The rods 77—77' are slidably mounted in bearings 79, that are attached to the frame 5.

Referring to Figs. 4 and 5 the actuating rods 77—77' are shown. Each rod has mounted, adjacent the end thereof, a bracket 79', and both brackets 79' have a rod 80 pivoted thereacross. (Fig. 5.) The rod is spring pressed, as at 81, in a counter clockwise direction against internal stops 82 in the brackets. Engaging fingers 83 are mounted on the rod 80 and are urged into an elevated position at all times by action of the springs 81. The fingers 83 are adapted to engage the lowermost pallet in the stack and force the same toward the mold.

Each rod 77—77' carries a collar 90 having a bracket 91 thereon, that is bifurcated at 92, to engage the projecting ends of a shaft 93 that extends through the movable plate 63.

I will now describe the means whereby the pallets are carried from beneath the mold with the molded blocks thereon to an endless conveyor and from thence to a roller conveyor to be stacked.

The shaft S³ has mounted thereon at 100 and 101, a pair of independent eccentric cams. A vertically slidable pallet conveyor assembly, designated as an entirety at 104, is mounted on slides 105 and 106 extending between each pair of guide rods 15. This assembly comprises a transverse member 107 having vertical pins loosely mounted therein as at 108 (Figs. 4 and 12 to 16 inclusive). These pins have a table 109 mounted there across and this table is spring elevated as at 110. The slides 105 and 106 have pins thereon which pins carry rollers 111 and 112 that ride on the eccentric cams 100 and 101. Rotation of the cams on the shaft S³ will cause vertical reciprocation of the pallet conveyor assembly 104. The rods 77 and 77' carry ejecting fingers 115 and 116 which are adapted to engage the lowermost pallet P on the pallet conveyer and slide it rearwardly onto the endless conveyer 118 when the pallet conveyor is lowered away from the mold after the molding operation.

Figure 10:
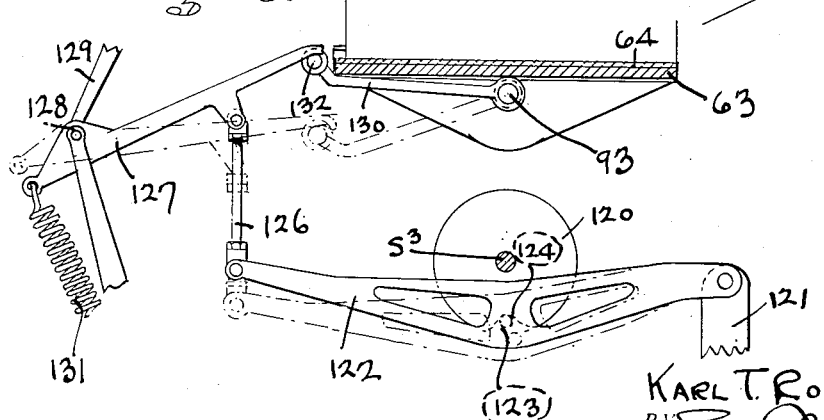
Fig. 10 is a fragmentary sectional view through the removable mold bottom and showing the assembled operative elements of an automatic locking mechanism employed.

The shaft S³ has a cam member 120 thereon (Fig. 10). A link 121 secured to the frame, is pivoted to a cross member 122 which carries a stop pin 123. The cam member 120 has a cam depression 124 therein in which the pin 123 comes to rest at the end of each cycle of operation of the machine (the operation of which will appear in detail hereinafter). The cross member 122 is pivoted at its front end to a suspension rod 126, which in turn is pivoted at its other end to a swinging arm 127 pivoted at 128 to a fixed frame bar 129. The swinging arm 127 is spring pressed by the spring 131.

An arm 130 is pivotally mounted in an eccentric 93' on the shaft 93 that is journaled beneath the mold bottom plate 63. A spring 135 is coiled around the shaft 93 and at one end said spring is anchored to the plate 63 and at its opposite end secured to one of the eccentrics 93''. The free end of the arm 130 is pressed by means of the spring 135, onto the under surface of the arm 127. The arm 130 has a roller 132 to ride on the arm 127.

The above mentioned parts are thought to adequately define my invention as regards the specific elements that cooperate to make up the same, and I will now proceed with a full description of the operation of the device.

The nature of this specification is sufficiently complicated that a preliminary description of the general principles of the invention, reference being had only to the sheet containing Figs. 12 to 16 inclusive, is thought to be in order.

When the device is set into operation and the process of forming the blocks is begun, the mold 17, ejector member 55, movable bottom 63, one of the pallets P, and pallet conveyer 104' occupy the position shown in Fig. 12, with the removable bottom firmly pressed against the mold by virtue of the eccentric 93'. The bottom 63, with its rubber facing 64, lies beneath the mold. The mold is first filled with a dry mixed concrete mass M as shown in Fig. 13. During the filling operation the mold is vibrated to settle and compact the mass into the mold. The surplus material M' is removed until the mold is filled flush with the top thereof and the agitator 28 has shaken the mold until the material has settled into a hard mass. In Fig. 14 the removable bottom 63 begins to travel from beneath the mold and one of the pallets P takes its place, the eccentric 93 operating to release the firm engagement of the bottom with the mold. The pallet conveyor 109 simultaneously rises to receive the pallet and hold said pallet beneath the mold. In Fig. 15 the movable bottom has receded and one of the pallets P is beneath the mold. The pallet holder 104 resiliently engages the pallet to hold it under the mold and the ejector 55 moves to eject the material from the mold. In Fig. 16 the ejector forces the material out of the mold onto the pallet and the pallet holder automatically lowers so that a mover 115 on the bars 77—77' can transfer the pallet and molded blocks onto the endless conveyor.

Reference being had to the above preliminary description, it will be seen that the motor G drives the shaft S¹ which in turn drives the pulley 34 (Fig. 2). Pressure on the foot pedal 35 throws the clutch 40 so as to rotate the shaft S² and other operative parts of the machinery. The pawl pin 123 (Fig. 10) travels on the cam surface of the rotating member 120. The mold has been filled and the removable bottom is in place. The ejector is elevated and the resilient pallet support and conveyor it at its lowermost position.

The shaft S² through the train of gears shown in Fig. 1 operates the gear 43 and the ejector 55 commences its downward stroke while the resilient conveyor 104 commences its upward stroke. The agitator operates through the belt B. The parts assume for an instant the position diagrammatically indicated in Fig. 14 and through the medium of the reciprocating rods 77 and 77' the spring fingers 83 engage a pallet and slide the same onto the track 104' provided for the same. The pallets bear against each other edgewise and one pallet is forced beneath the mold to replace the bottom 63 which is removed by the member 91 acting on the same. The resilient pallet holder is elevated by the cam members 130. At this point the ejector passes into the mold and forces the material therein onto the pallet P and the loaded pallet on the pallet holder is lowered so that the loaded pallet can be transferred onto the conveyor 118 by means of the fingers 115. Simultaneous with the lowering of the loaded pallet, the movable bottom 63 travels towards the mold to close the bottom of the same. The ejector 55 travels upwardly and at such a time as the bottom completely closes the mold, the pin 123 enters the cam depression 24 where frictional resistance thereto operates to disengage the clutch and cease movement of the machine. This operation may again be repeated.

I am aware that some changes may be made in the general arrangements and combinations of the several devices and parts, for example, the 126 to 130 inclusive cooperate merely to form an auxiliary means for giving positive engagement between the pin 123 and cam member 120. They may be omitted if desired. Any changes such as performing this omission may be executed without departing from the scope of the invention as set forth in the foregoing description and as defined in the following claims. Hence, I do not desire to limit myself to the exact arrangement of parts as described, nor do I confine myself to the exact details of construction of the said parts as illustrated in the accompanying drawings. Only in so far as I have particularly pointed out my invention in the appended claims do I desire to be limited.

The word "plastic" used in this specification and claims refers to a mix of concrete or monolithic material of such consistency as to flow under the action of vibration.

Having thus described this invention, what I now claim and desire to secure by Letters Patent is:

1. A device of the character described comprising a mold open at opposite sides; a closure for one side thereof; means for uncovering said side of the mold by removing the closure; means for passing a pallet under the uncovered side of said mold; means for ejecting material from the mold onto the pallet, and means movable toward and away from the uncovered side of said mold to support said pallet and the material ejected thereon.

2. A device of the character described comprising a mold open at opposite sides; a closure for one side thereof; means for removing said closure; means for passing a pallet beneath the mold in place of the closure; means for ejecting material from the mold onto said pallet; and means for removing the pallet with the molded material thereon from beneath the mold.

3. A device of the character described comprising a mold open at opposite sides; a closure for one side thereof; means for removing said closure; means for passing a pallet beneath the mold in place of the closure; means for ejecting material from the mold onto said pallet; means for simultaneously removing the pallet with the molded material thereon from beneath the mold and replacing said closure.

4. A device of the character described comprising a mold open at opposite sides; a removable closure for one side thereof; means for alternately substituting one of a series of pallets for said removable closure beneath said mold; and means for ejecting material molded on the closure from said mold onto one of said pallets.

5. A device of the character described comprising a mold, open top and bottom; a removable bottom therefor; means to simultaneously remove said bottom and substitute a pallet beneath said mold; means for ejecting material from said mold onto said pallet; and means for simultaneously removing the pallet and ejected material from beneath said mold and replacing said removable bottom.

6. A device of the character described comprising an open mold; a plate having a resilient facing thereon to close the bottom of the mold; means to remove said bottom and to pass a pallet beneath said mold; means for ejecting material from said mold onto the pallet; said first mentioned means adapted to force the pallet with the molded material thereon from beneath the mold simultaneously with the movement of the ejecting means; and means for replacing the removable bottom beneath the open mold.

7. A device of the character described comprising an open mold; a removable bottom therefor; means for removing said bottom from beneath said mold; means for passing a pallet beneath said mold; means for ejecting material from said mold onto said pallet; means for lowering said pallet with the material thereon simultaneously with the movement of the ejecting means; means for replacing said bottom; and means for removing said lowered pallet and material.

8. A device of the character described comprising a frame; a mold mounted on said frame; means for agitating said mold; a resilient bottom for said mold slidably mounted relative thereto; a pallet rack having a plurality of pallets thereon; means for simultaneously removing the bottom from the mold and substituting a pallet; a support to hold said pallet in resilient engagement with the mold; means for raising and lowering said support with the pallet thereon; an ejector to force material from said mold onto the pallet and simultaneously lowering the pallet and molded material from beneath said mold; and means for removing said pallet with the molded material thereon away from the mold.

9. A device of the character described comprising a mold open at opposite sides; a closure for one side thereof; means for moving said closure along side the open side of the mold, thereby uncovering said side; means to move a pallet toward and away from said open side; and means to move a pallet over said last mentioned means.

10. A device of the character described comprising a mold open at opposite sides; a closure for one side thereof; means to remove said closure; means for passing a pallet in place of the closure; means for ejecting material from the mold onto said pallet; and means to simultaneously actuate said ejecting means and move said pallet away from said closure.

11. A device of the character described comprising a mold open at opposite sides; a closure for one side thereof; means for removing said closure; releasable means for holding said closure on said mold; means to vibrate said mold and closure as a unit; means to release said holding means and to remove said closure; means to eject the material from the mold; means to restore said closure to its operative position; and means to move a pallet away from said closure simultaneously with the action of the ejecting mechanism.

12. In a device of the character described a frame, a mold, an ejector mechanism to eject the contents of the mold, and a block removing mechanism operating in a plane at right angles to the direction of movement of the ejector mechanism to provide intermittently moving supporting surfaces for the ejected block.

KARL T. ROMIE.